United States Patent
Hsu et al.

(10) Patent No.: US 7,572,836 B2
(45) Date of Patent: Aug. 11, 2009

(54) METHOD OF PREPARING A COPOLYMER AND USING SUCH AS A DISPERSING AGENT FOR TITANATE-BASED CERAMIC COLLOIDS

(75) Inventors: Kung-Chung Hsu, Taipei (TW); Chih-Hao Chen, Linbian Township, Pingtung County (TW); Yu-Ping Tsai, Changhua (TW); Wen-Cheng Wei, Taipei (TW)

(73) Assignee: National Taiwan Normal University, Taipei (TW)

( * ) Notice: Subject to any disclaimer, the term of this patent is extended or adjusted under 35 U.S.C. 154(b) by 433 days.

(21) Appl. No.: 11/397,579

(22) Filed: Apr. 5, 2006

(65) Prior Publication Data

US 2007/0060657 A1   Mar. 15, 2007

(30) Foreign Application Priority Data

Sep. 13, 2005   (TW) .............................. 94131462 A

(51) Int. Cl.
  *B01F 3/12*   (2006.01)
  *B01F 17/00*  (2006.01)
  *B22F 1/00*   (2006.01)
(52) U.S. Cl. .................. 516/90; 516/203; 526/240; 526/264; 526/318
(58) Field of Classification Search ............ 516/88, 516/90, 203; 106/504, 505; 524/413, 547; 526/287
See application file for complete search history.

(56) References Cited

U.S. PATENT DOCUMENTS 5,100,984 A * 3/1992 Burge et al. ............ 526/240
6,232,369 B1 * 5/2001 Ma et al. ............... 523/161
2004/0131831 A1 * 7/2004 Yoshikawa et al. ...... 428/209
2007/0043189 A1 * 2/2007 Hsu et al. ............. 526/318.43

FOREIGN PATENT DOCUMENTS

JP     02002079005 A   *   3/2002

* cited by examiner

Primary Examiner—Ling-Siu Choi
Assistant Examiner—Chun-Cheng Wang
(74) Attorney, Agent, or Firm—The Weintraub Group, PLC

(57) ABSTRACT

This invention relates to the preparation of a copolymer which is used as a dispersing agent for titanate-based ceramic colloids. This copolymer has the following structure:

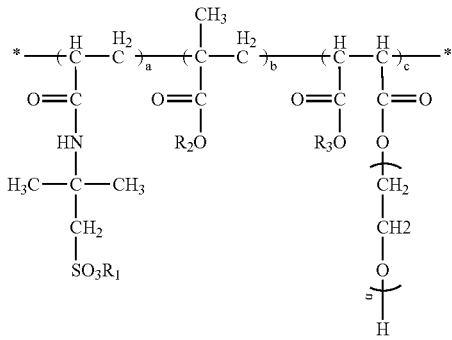

Wherein $R_1$ is H, $NH_4$, alkali metals; $R_2$ is H, $NH_4$, alkali metals; $R_3$ is H, $NH_4$, alkali metals; a is an integer from 1 to 2000; b is an integer from 1 to 5000; and c is an integer from 1 to 1000; n is an integer from 1 to 500.

11 Claims, 6 Drawing Sheets

METHOD OF PREPARING A COPOLYMER AND USING SUCH AS A DISPERSING AGENT FOR TITANATE-BASED CERAMIC COLLOIDS

BACKGROUND OF THE INVENTION

1. Field of the Invention

The present invention relates to a method of preparing a copolymer and using such as a dispersing agent for titanate-based ceramic colloids.

2. Description of the Related Art

Titanate-based ceramic powder such as barium titanate and lead zirconate titanate are used extensively in the electronic industry. For example, barium titanate is used as a raw material for manufacturing capacitors, inductors, and thermistors, etc. In a manufacturing process, it is necessary to add a solvent to the titanate-based ceramic powder to produce colloids. At present, there are two types of solvents used by the industry, and they are water and organic solvents. Since the aqueous barium titanate colloid causes insignificant pollutions, therefore it becomes increasingly popular.

The dispersing effect of a titanate-based ceramic powder in a solvent has significant influence on the manufacturing quality of a product, and ceramic powder with a poor dispersing property will be piled up unevenly and produce a green sheet with lesser density, and the sintered part is less denser and easier to break, and thus resulting a low yield rate and poor electric properties. (Refer to Kumar V, "Solution-precipitation of fine powders of barium titanate and strontium titanate", J. Am. Ceram. Soc., 82(10): 2580-84 1991). Therefore, industrial titanate-based ceramic colloids require an addition of a dispersing agent to facilitate the later manufacturing process and produce high-quality products.

As to aqueous ceramic colloids, most of the present industrial dispersing agents used are acrylate-based polymers or copolymers such as ammonium polymethacrylate (Darvan C) or sodium polyacrylate. In recent years, many researches are conducted on the subjects of using Darvan C or acrylic polymer as a dispersing agent for barium titanate and other ceramic such as aluminum oxide, titanium dioxide, and zirconium oxide powders. (Refer to Zhao JL, Wang XH, Gui ZL, Li LT, "Dispersion of barium titanate with poly(acrylic acid-co-maleic acid) in aqueous media", Ceram. Int. 30(7): 1985-88 2004; Saravanan L, Subramanian S, "Surface chemical studies on the competitive adsorption poly(ethylene glycol) and ammonium poly (methacrylate) onto alumina", J. Colloid Int. Sci. 284(2): 363-377 2005; Shi YC, Wu YS, Li JG, Li GZ, "Surface and rheology characterization of NH(4) PAA-stabilized nanosized $TiO_2$ suspensions, "J. Dispersion Sci. Tech. 24(5): 739-743 2003☐ Paik U, Hackley VA, Lee J, Lee S ", Effect of poly(acrylic acid) and poly(vinyl alcohol) on the solubility of colloidal $BaTiO_3$ in an aqueous medium"J. Mater. Res. 18(5): 1266-74 2003; Liu DM, "Influence of dispersant on powders dispersion and properties of zirconia green compacts", Ceram. mt. 26: 279-87 2000). Although results show that Darvan C or acrylic polymer provides a good dispersing effect, further improvements are needed. For example, a barium titanate colloid using Darvan C as a dispersant has a poor dispersing effect when a small quantity of Darvan C is added, and the barium titanate particles in the colloid will settle quickly, and thus the colloid cannot maintain a suspending state for a long time.

Further, if Darvan C is used as a dispersing agent for the barium titanate colloids, the quantity of dissolved barium ions in aqueous solutions will be increased. Excessive barium ions will be deposited on the surface of the ceramic powder during a drying process, and thus will adversely affect the electric properties as well as other properties of the sintered part. The dispersing agent of the present invention can overcome the foregoing shortcoming and evenly disperse the colloids.

The present electronic components tend to be developed with a smaller size and more powerful functions, and thus breakthroughs for the manufacturing processes are urgently needed, and one of the subjects is to achieve a better dispersing effect for ceramic powers having a very small particle diameter. Therefore, a dispersing agent plays a main role on the application of dispersing various different ceramic powders. The titanate-based ceramic colloid having a good dispersing effect is absolutely superior in manufacturing processes and provides a good yield rate for ceramic products as well as a higher capacitance which can further comply with market requirements and enhance competitiveness.

Most of the present dispersing agents used for ceramic powders are polymeric surfactants, and the dispersant in a colloid relies on its dissociation to produce ionic functional groups. After the dissociated dispersant is adsorbed onto the powder, the surface of the powder will carry the same electric charge that can produce an electrostatic repulsion for the dispersion. In another dispersing mechanism, there are many side chains of the adsorbed dispersing agent on the surface of particles, and the powder can be dispersed very well due to the steric hindrance (Refer to Napper D H, Polymeric Stabilization of Colloidal Dispersions, Academic Press: New York, 1983). In summation of the description above, the type and the quantity of both functional groups and side chains in the molecular structure of a polymeric dispersant are major factors that affect the dispersing effect of the dispersing agent.

SUMMARY OF THE INVENTION

The primary objective of the present invention is to provide a method of preparing a copolymer.

Another objective of the present invention is to provide a copolymer used as a dispersing agent for titanate-based ceramic colloids.

The dispersing agent of the present invention is an anionic copolymer—PAMC obtained by reacting or polymerizing 2-acrylamido-2-methylpropane sulfonic acid, methacrylic acid, maleic anhydride, and polyethylene glycol. The testing result shows that dispersing agent—PAMC of the present invention not only reduces the quantity of barium ions produced in the barium titanate colloid, but also maintains the same dispersing effect for the barium titanate powder while the added quantity of PAMC is less than that of Darvan C. Therefore, the colloid can maintain its suspending state for a long time, and the anionic copolymer of the present invention definitely can achieve the effect of dispersing titanate-based ceramic particles in aqueous solutions.

The copolymer of the present invention has the following structure:

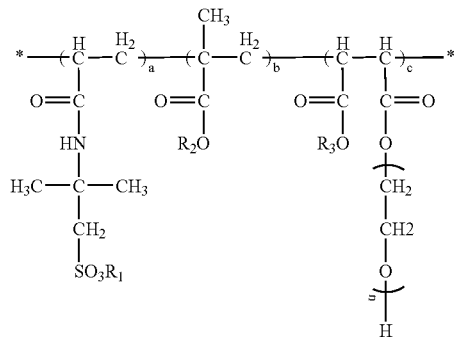

Wherein $R_1$, $R_2$, and $R_3$ are H, $NH_4$, or an alkaline metal, and a is an integer from 1 to 2000, b is an integer from 1 to 5000, c is an integer from 1 to 1000, and n is an integer from 1 to 500.

DETAILED DESCRIPTION OF THE PREFERRED EMBODIMENTS

The method of synthesizing a monomer of the present invention and its copolymer is illustrated by the following embodiments:

Embodiment 1

Prepare a solution by putting a portion of polyethylene glycol (Mw=400) and a portion of maleic anhydride into a four-necked flask, and stir until the solutes are dissolved, and then add 0.002 portion of a catalyst (Triethylamine), and increase the temperature slowly to 90° C. by passing nitrogen gas and continue the reaction for 5 hours, so as to obtain a transparent yellow liquid of 0.89 portion of β-carboxylate (hydroxyl acrylic polyester) (CHAP).

Figure 1:
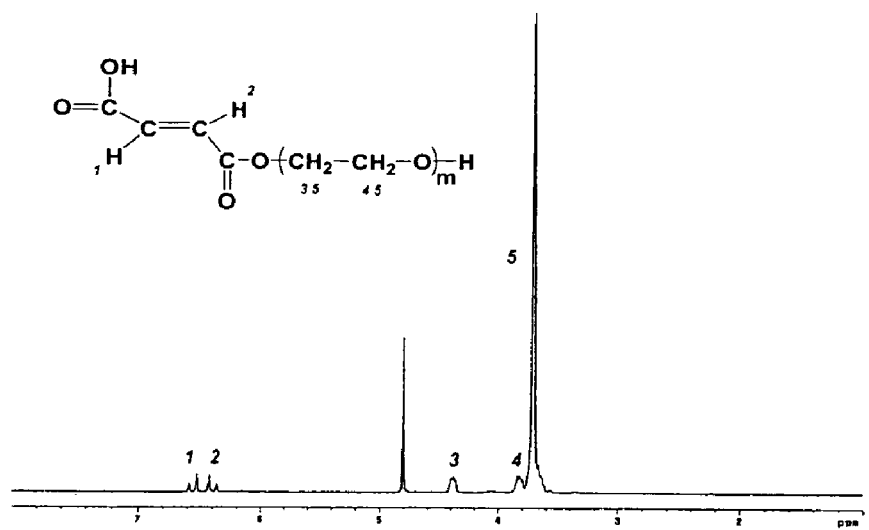
FIG. 1 is an $^1$H-NMR spectrogram of CHAP.
Figure 2:
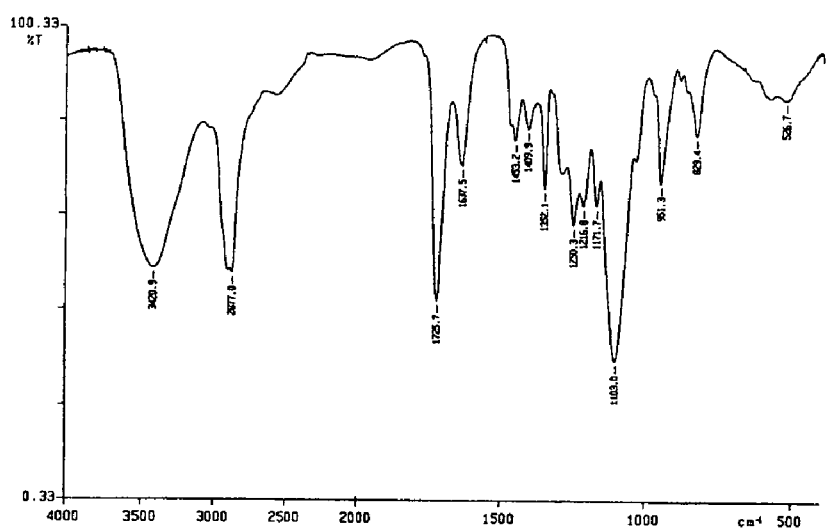
FIG. 2 is an IR spectrogram of CHAP.

In the $^1$H-NMR and IR spectrograms of CHAP as shown in FIGS. 1 and 2, the structure of the product is confirmed as β-carboxylate (hydroxyl acrylic polyester).

The $^1$H-NMR (nuclear magnetic resonance) spectrogram of CHAP is shown in FIG. 1 wherein δ=3.7-3.8, 4.4, 6.4, and 6.5 ppm, and each has a resonant peak. The infrared (IR) spectrogram is shown in FIG. 2, wherein the absorption peaks include 3421 cm$^{-1}$ (—OH), 1726 cm$^{-1}$ (—C=O), 1637 cm$^{-1}$ (—C=C), and 1103 cm$^{-1}$ (—C—O—C).

Embodiment 2

Put 0.5 portion of CHAP of Embodiment 1, 2 portions of 2-acrylamido-2-methylpropane sulfonic acid, and 3 portions of methyl acrylic acid into 275 ml of deionized water, and the overall concentration of the monomers is 1.4 M. After adjusting with 1N sodium hydroxide solution to pH=7~8, the solution is poured into a four-necked flask, and the temperature is increased slowly to 70° C. by passing nitrogen gas, and then add the ammonium persulphate and sodium methyl allyl sulfonate solution of different concentrations drop by drop for a continuous reaction for 2 hours. After the reaction is completed, an appropriate quantity of acetone is used for extraction. After the purification, a few drops of hydroquinone are added, and then the substance is placed into the vacuum oven and baked at 50° C. for 24 hours to obtain a brown transparent copolymer.

Figure 3:
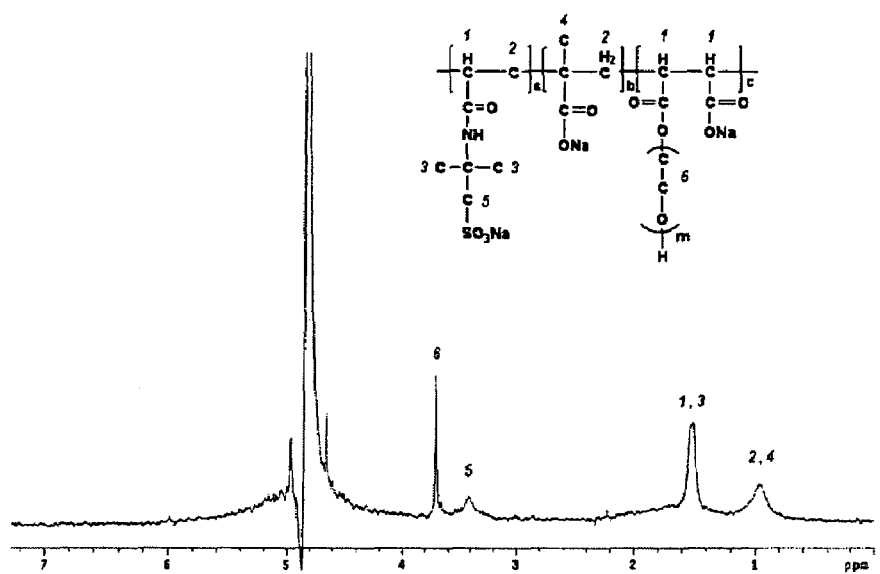
FIG. 3 is an $^1$H-NMR spectrogram of PAMC.
Figure 4:
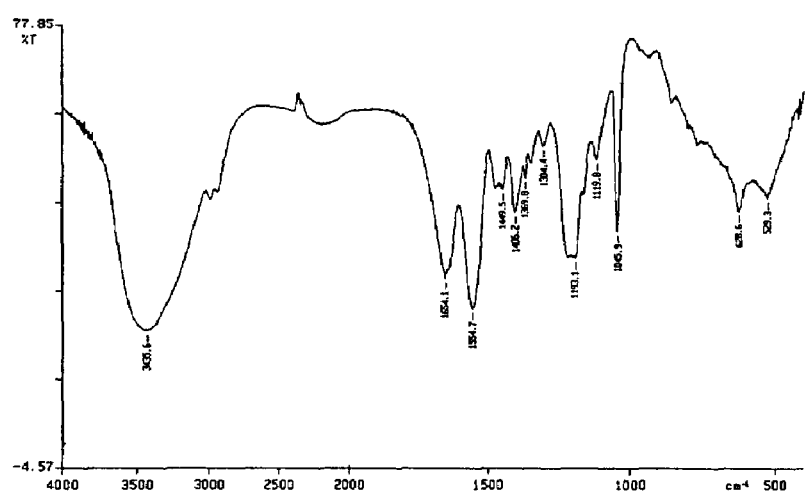
FIG. 4 is an IR spectrogram of PAMC.

From the $^1$H-NMR and IR spectrogram of the product (as shown in FIGS. 3 and 4), the structure of the product is (2-acrylamido-2-methylpropane sulfonic acid)/methacyrlic acid/(β-carboxylate (hydroxyl acrylic polyester)) (PAMC). The $^1$H-NMR (nuclear magnetic resonance) spectrogram of the PAMC is shown in FIG. 3, wherein δ=0.95, 1.5, 3.4, and 3.7 ppm and each has a resonant peak. The infrared (IR) spectrogram is shown in FIG. 4, wherein the absorption peaks include: 3435 cm$^{-1}$ (—OH), 1554 cm$^{-1}$ (—N—H), 1654 cm$^{-1}$ (—C=O), 1193 cm$^{-1}$ (—C—O—C), 1045 cm$^{-1}$ (—S=O), and 628 cm$^{-1}$ (—S—O). Further, the weight average molecular weight of this copolymer measured by the gel permeation chromatography (GPC) is $9.3 \times 10^4$, and the number average molecular weight is $3.1 \times 10^4$.

Embodiment 3

Two different dispersing agents and a barium titanate powder are used in this embodiment to carry out the preparation of two types of barium titanate aqueous colloids, and the submicron barium titanate powder is supplied by Prosperity Dielectrics Co., Ltd., and one of the dispersing agents is a physical substance of the present invention, and another dispersing agent is Darvan C produced by S. T. Vanderbilt Company.

Firstly, the two types of dispersing agents are dissolved into deionized water, and then the barium titanate powder is added, and 1N NaOH is used to adjust a pH value to 9. The dispersing solution used for this embodiment changes the ratio of percentage by weight of the dispersing agent and barium titanate powder to 0.05:100, 0.1:100, 0.15:100, 0.2:100, 0.4:100, 0.6:100, 0.8:100, and 1:100, and the ratio of percentage by weight of water and barium titanate powder is 2:3. A sample is ball-milled for 24 hours, and a digital viscometer (Brookfield viscometer LVTD V-II; USA) is used for measuring its viscosity.

Figure 5:
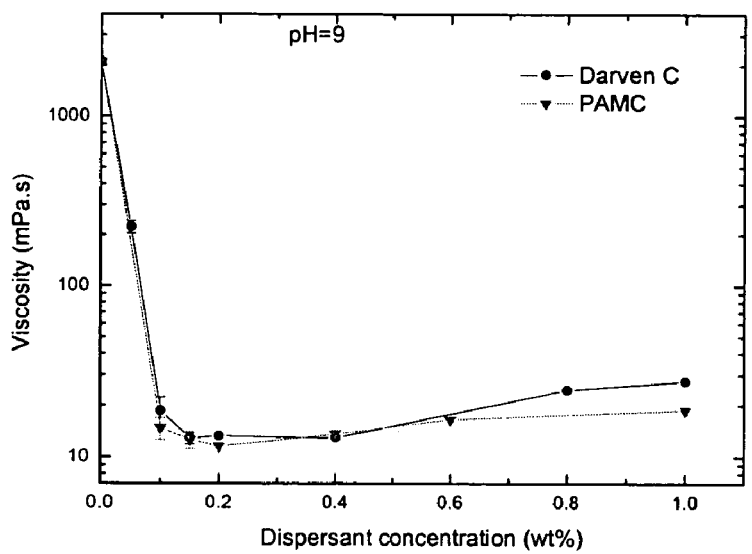
FIG. 5 shows the influence of concentration of the dispersing agent on the viscosity of barium titanate colloids.

FIG. 5 shows the influence of concentration of the dispersing agent on the viscosity of barium titanate colloids. In FIG. 5, when the viscosity of the colloid drops to 11 mPa·s, the required concentration is 0.1~0.2wt % which is less than the required concentration of Darvan C, primarily because PAMC contains more charged functional groups to provide electrostatic repulsions. Furthermore, the long side chains of CHAP can provide steric hindrance and achieve a better dispersing effect.

Embodiment 4

Firstly, the two types of dispersing agents are dissolved into deionized water, and then barium titanate powder is added, and 1N NaOH is used to adjust a pH value to 9. The dispersing solution used for this embodiment changes the ratio of percentage by weight of the dispersing agent and barium titanate powder to 0:100, 0.1:100, 0.2:100, 0.3:100, 0.4:100, 0.6:100, 0.8:100, and 1:100, and the ratio of percentage by weight of water and barium titanate powder is 4:1. A sample is ball-milled for 24 hours, and a laser particle size analyzer (Mastersizer 2000, Malvern, UK) is used to measure the particle diameter of the barium titanate colloid.

Figure 6:
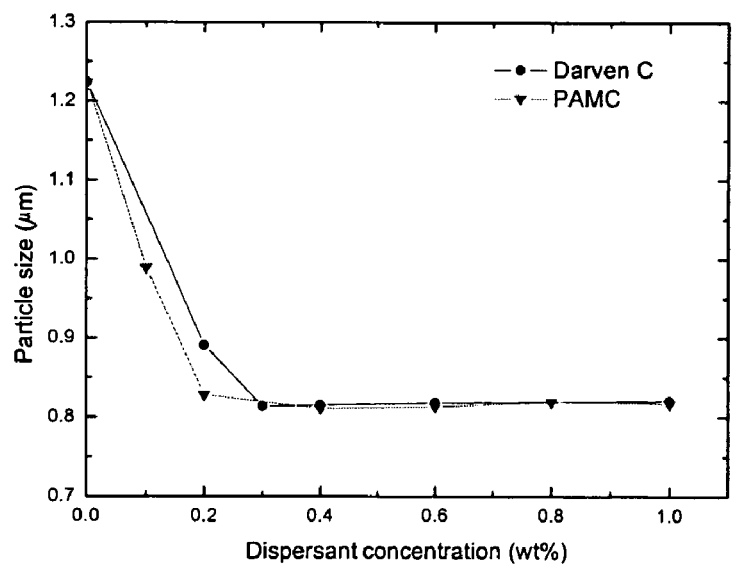
FIG. 6 shows the influence of concentration of the dispersing agent on the $D_{50}$ particle diameter of the barium titanate particle in barium titanate colloids.

FIG. 6 shows the influence of concentration of the dispersing agent on the $D_{50}$ particle diameter of the barium titanate particles in the barium titanate colloid. In FIG. 6, if the concentration of PAMC is 0.2 wt %, the $D_{50}$ particle diameter can reach 0.82 μm; and if the concentration of Darvan C is 0.2 wt %, then the $D_{50}$ particle diameter is 0.89 μm. It shows that PAMC definitely gives a good dispersing effect to the barium titanate particles in aqueous solutions.

Embodiment 5

Figure 7:
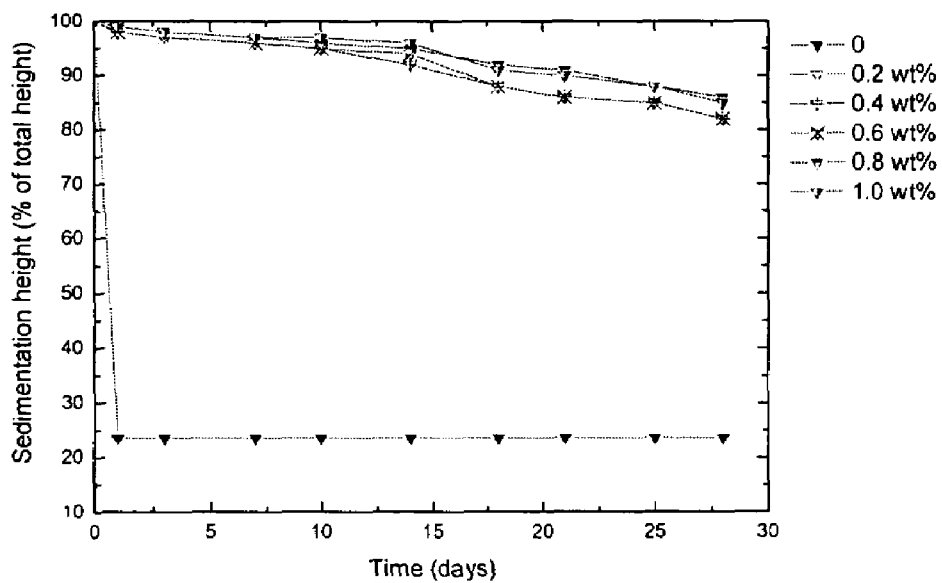
FIG. 7 shows the influence of concentration of PAMC on the relative sedimentation height of 20 wt % barium titanate colloids.
Figure 8:
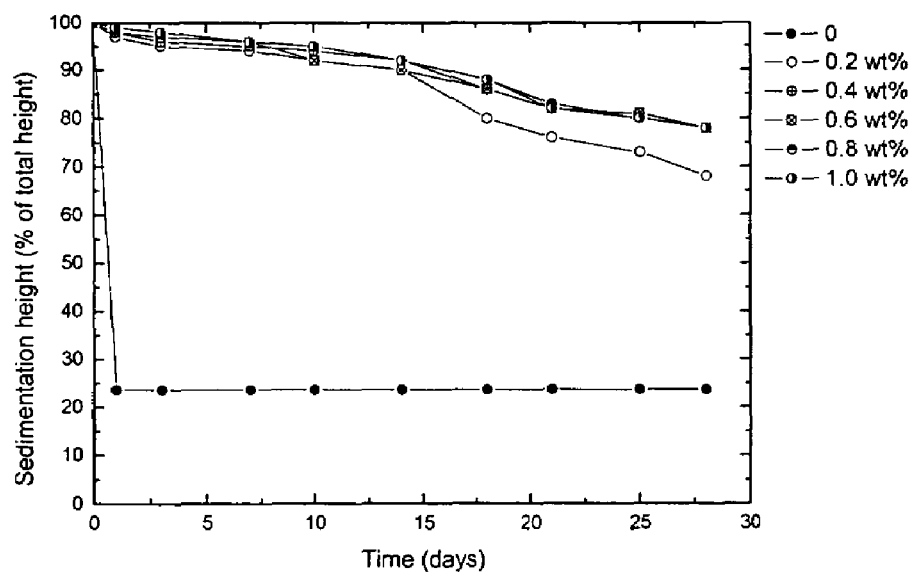
FIG. 8 shows the influence of concentration of Darvan C on the relative sedimentation height of 20 wt % barium titanate colloids.

In the preparation of the dispersing solution, the ratio of percentage by weight of barium titanate powder and deionized water is 1:4, and the ratio of the concentration of dispersing agent and the percentage by weight of the powder is changed to 0:100, 0.2:100, 0.4:100, 0.6:100, 0.8:100, and 1.0:100, and the 1N NaOH is used to adjust a pH value to 9. After a sample is ball-milled for 24 hours, the barium titanate colloid is poured into a graduated cylinder and sealed and sat still to observe the change of its relative sedimentation height. FIG. 7 shows the relation between the elapsed time and the relative sedimentation height of the barium titanate colloid with adding the PAMC. If the barium titanate colloid has no dispersing agent added, the particles will be agglomerated, dispersed poorly, and settle quickly. Within a day, most particles will be settled down, and two layers including a water layer and a sediment layer can be observed in the graduated cylinder. After 0.2 wt % of PAMC is added to the barium titanate colloid, most of the barium titanate particles are found suspending in the graduated cylinder, due to a good dispersing effect. The suspending liquid in the graduated cylinder remains a turbid form, and 82% of the total height of the suspending layer can be maintained after 28 days. FIG. 8 shows the relation between the elapsed time and the relative sedimentation height of the barium titanate colloid with adding the Darvan C. In FIG. 8, if 0.2 wt % of PAMC is added, 70% of the total height of the suspending layer can be maintained after 28 days, and thus a good dispersing effect can be achieved by adding PAMC as the dispersing agent of the barium titanate colloid.

Embodiment 6

In the preparation of the dispersing solution, the ratio of percentage by weight of barium titanate powder and deionized water is 3:2, and the ratio of the concentration of the dispersing agent and the percentage by weight of the powder is changed to 0:100, 0.2:100, 0.3:100, 0.6:100, and 1:100, and 1N NaOH is used to adjust a pH value to 9. After a sample is ball-milled for 24 hours, the barium titanate power in the aqueous solution is settled by gravitation force. Compacts were obtained from gravitational settlement and consolidation of the ceramic powder. After the compact is dried, a sample slice is taken and weighed. A fingernail polish with a known density is coated on the sample slice, and the weight and density of the green part can be measured by means of the Archimedes' principle.

Figure 9:
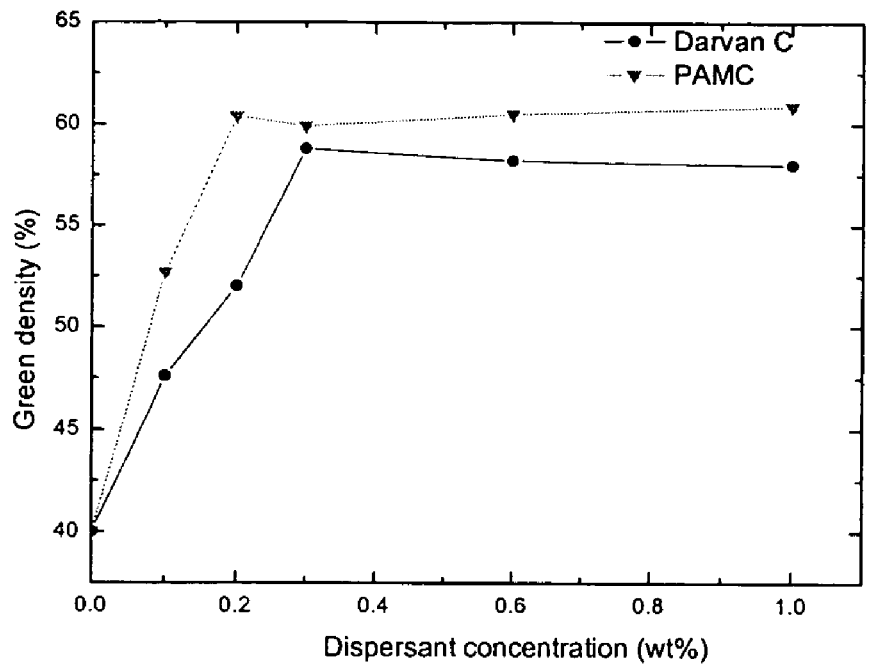
FIG. 9 shows the influence of concentration of the dispersing agent on the density of barium titanate green parts.

FIG. 9 shows the relation between the concentration of the dispersing agent and the relative density of the barium titanate green part. If Darvan C is used as a dispersing agent, the density of the barium titanate green part will increase with increasing concentration of the dispersant, indicating that the barium titanate particles can be dispersed evenly, and the packing of particles will be denser if Darvan C is used as a dispersing agent. If PAMC is used as a dispersant, then the relative density of the green part will be increased as well. Only adding 0.2 wt % of PAMC can increase the relative density of the green part to about 61%. When 0.3 wt % of Darvan C is added, the density is increased to 59%. This indicates that PAMC can effectively disperse particles, and thus increase the density of the resulting barium titanate green part.

Embodiment 7

In the preparation of the dispersing solution, the ratio of percentage by weight of barium titanate powder and deionized water is 3:2, and the ratio of the concentration of the dispersing agent and the percentage by weight of the powder is changed to 0:100, 0.2:100, 0.4:100, and 0.6:100, and 1N NaOH is used to adjust a pH value to 9. After a sample is ball-milled for 24 hours, the barium titanate colloid is spun by a centrifugal force with a rotation speed of 4000 rpm for 20 minutes, and then the clear solution obtained after being spun by the centrifuge is measured by an inductively coupled plasma-mass spectrometer (ICP-MS, HP4500 series, USA).

Figure 10:
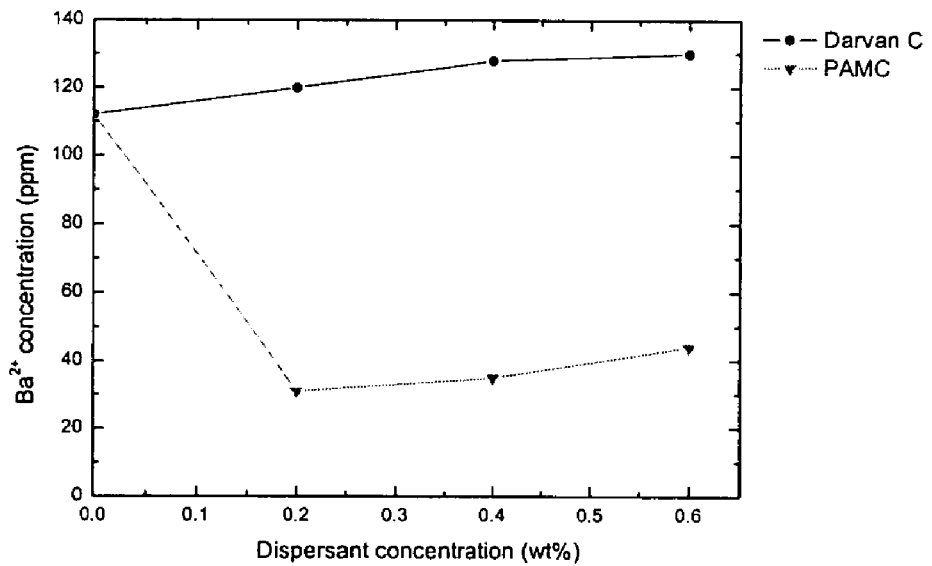
FIG. 10 shows the influence of concentration of the dispersing agent on the quantity of dissolved barium ions in barium titanate colloids.

FIG. 10 shows the relation between the concentration of the dispersing agent and the quantity of dissolved barium ions. If Darvan C is used as a dispersant, the quantity of barium ions produced will increase with increasing concentration of the dispersing agent. In contrast, if PAMC is used as a dispersing agent, then the concentration of barium ions produced in the solution will be decreased. Such result shows that PAMC can suppress the dissolution of barium ions in the barium titanate colloid, which can greatly help stabilizing the colloid.

Embodiment 8

In the preparation of the dispersing solution, the ratio of percentage by weight of barium titanate powder and deionized water is 3:2, and the ratio of the concentration of dispersing agent and the percentage by weight of the powder is changed to 0:100, 0.2:100, 0.4:100, 0.6:100, and 0.8:100, and 1N NaOH is used to adjust a pH value to 9. After the sample is ball-milled for 24 hours, the sample is baked dry, ground into powder, and sieved and pressed into a disc shape. The sample is coated with a silver paste after being sintered at a constant temperature of 1280° C. for 4 hours to obtain a silver electrode surface. An impedance analyzer (HP 4284A Precision LCR meter, USA) is used to measure the frequency of 1 KHz. The sample sheet is clipped onto the electrodes for measuring the capacitance and the dielectric factor. The dielectric constant and the dielectric loss can be computed by related formulas.

Figure 11:
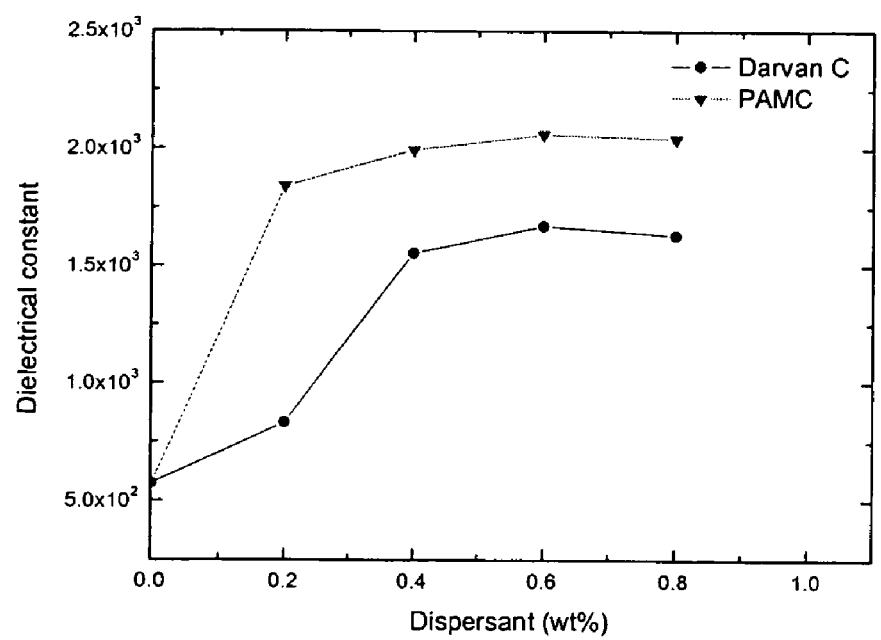
FIG. 11 shows the influence of concentration of the dispersing agent on the dielectric constant of barium titanate sintered parts.

FIG. 11 shows the influence of concentration of the dispersing agent on the dielectric constant of the barium titanate sintered part, and the result shows that the dielectric constant of barium titanate sintered part with adding PMAC is higher than the dielectric constant of the barium titanate sintered part with adding Darven C or without adding any dispersant.

Figure 12:
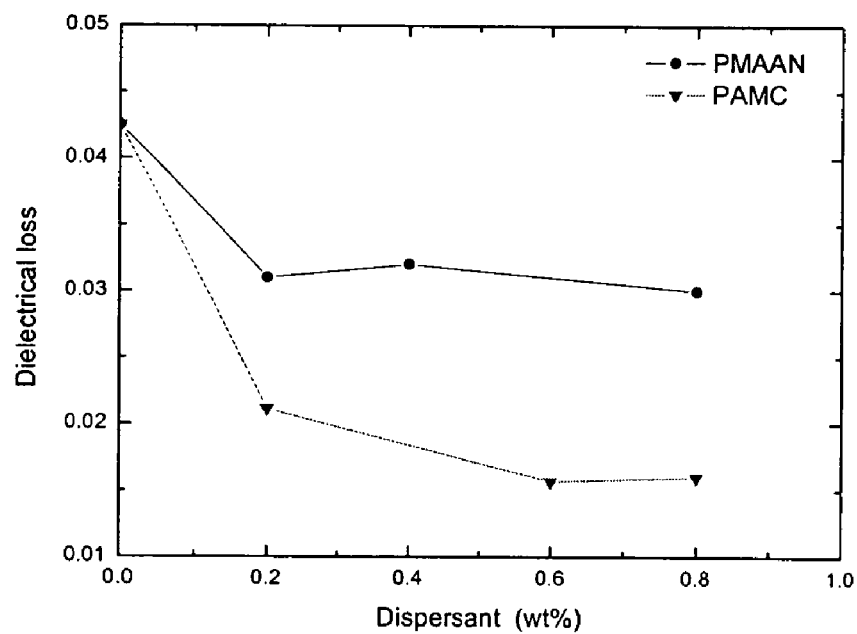
FIG. 12 shows the influence of concentration of the dispersing agent on the dielectric loss of barium titanate sintered parts.

FIG. 12 shows the influence of concentration of the dispersing agent on the dielectric loss of barium titanate sintered part, and the result shows that the dielectric loss of the barium titanate sintered part with adding PMAC is lower than the dielectric loss of the barium titanate sintered part with adding Darven C or without adding any dispersant.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. An aqueous copolymer, used as a dispersing agent for titanate-based ceramic colloids, having the following molecular structure:

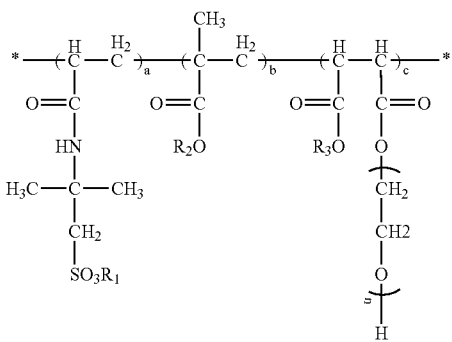

wherein $R_1$ is H, $NH_4$, or an alkaline metal group; $R_2$ is H, $NH_4$, or an alkaline metal group; $R_3$ is H, $NH_4$, or an alkaline metal group; a is an integer from 1 to 2000; b is an integer from 1 to 5000; c is an integer from 1 to 1000; and n is an integer from 1 to 500.

2. A ceramic colloid containing a copolymer, obtained by dissolving said copolymer of claim 1 by water, and adding a ceramic powder to form a suspending colloid to lower the viscosity of said ceramic colloid.

3. The ceramic colloid containing a copolymer of claim 2, wherein said ceramic powder is a titanate-based ceramic powder.

4. The ceramic colloid containing a copolymer of claim 2, wherein said copolymer is added with a quantity of 0.05~5.0 wt %.

5. The ceramic colloid containing a copolymer of claim 2, wherein said ceramic colloid has a lower viscosity than said ceramic colloid without adding said copolymer.

6. The ceramic colloid containing a copolymer of claim 2, wherein said ceramic colloid has a higher stability than said ceramic colloid without adding said copolymer.

7. The ceramic colloid containing a copolymer of claim 2, wherein said ceramic colloid has a smaller particle diameter than said ceramic colloid without adding said copolymer.

8. The ceramic colloid containing a copolymer of claim 2, wherein said ceramic colloid forms a green part after a drying process and said green part has a higher density than a green part without adding said copolymer.

9. The ceramic colloid containing a copolymer of claim 2, wherein said barium ion is dissolved in a quantity less than that of said ceramic colloid without adding said copolymer.

10. The ceramic colloid containing a copolymer of claim 2, wherein said ceramic colloid has a higher dielectric constant than said ceramic colloid without adding said copolymer.

11. The ceramic colloid containing a copolymer of claim 2, wherein said ceramic colloid has a lower dielectric loss than said ceramic colloid without adding said copolymer.

* * * * *